US012691948B2

(12) United States Patent
 Koogenahalli Sadashivaiah et al.

(10) Patent No.: US 12,691,948 B2
(45) Date of Patent: Jul. 28, 2026

(54) MUDFLAP FOR A VEHICLE, ASSOCIATED FENDER FOR A VEHICLE, METHOD OF CLEANING A MUDFLAP, AND METHOD OF CLEANING A FENDER

(71) Applicant: Volvo Truck Corporation, Gothenburg (SE)

(72) Inventors: Madhuchandra Koogenahalli Sadashivaiah, Bangalore (IN); Sudeendra Thirtha Koushik K S, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 288 days.

(21) Appl. No.: 18/401,845

(22) Filed: Jan. 2, 2024

(65) Prior Publication Data
 US 2024/0227945 A1 Jul. 11, 2024

(30) Foreign Application Priority Data
 Jan. 10, 2023 (EP) .................................... 23150947

(51) Int. Cl.
 *B62D 25/16* (2006.01)
 *B62D 25/18* (2006.01)
(52) U.S. Cl.
 CPC ......... *B62D 25/188* (2013.01); *B62D 25/182* (2013.01)
(58) Field of Classification Search
 CPC .............................. B62D 25/188; B62D 25/182
 See application file for complete search history.

(56) References Cited

U.S. PATENT DOCUMENTS

| | | | | |
|---|---|---|---|---|
| 9,707,938 B2 * | 7/2017 | Sanders | .................... | B60S 1/68 |
| 2020/0231220 A1 | 7/2020 | Petty | | |

FOREIGN PATENT DOCUMENTS

| | | |
|---|---|---|
| CN | 209757283 U | 12/2019 |
| CN | 210364083 U | 4/2020 |
| KR | 20180029610 A | 3/2018 |

OTHER PUBLICATIONS

Extended European Search Report for European Patent Application No. 23150947.2, mailed Jun. 13, 2023, 5 pages.

* cited by examiner

*Primary Examiner* — Marc Q Jimenez
*Assistant Examiner* — James J Triggs
(74) *Attorney, Agent, or Firm* — Withrow & Terranova, PLLC

(57) ABSTRACT

A mudflap for a vehicle, configured to be installed on the vehicle, comprising a base layer, configured to be attached to the vehicle; and an exposed layer, configured to be attached to the base layer and movable between an operation position, in which the exposed layer is attached to the base layer, and a cleaning position, in which the exposed layer is detached from the base layer; the base layer comprising a plurality of protrusions and the exposed layer comprising a plurality of orifices, the protrusions of the base layer being engaged in the orifices of the exposed layer when the exposed layer is in its operation position.

19 Claims, 2 Drawing Sheets

MUDFLAP FOR A VEHICLE, ASSOCIATED FENDER FOR A VEHICLE, METHOD OF CLEANING A MUDFLAP, AND METHOD OF CLEANING A FENDER

PRIORITY APPLICATIONS

The present application claims priority to European patent application Ser. No. 23/150,947.2, filed on Jan. 10, 2023, and entitled "MUDFLAP FOR A VEHICLE, ASSOCIATED FENDER FOR A VEHICLE, METHOD OF CLEANING A MUDFLAP, AND METHOD OF CLEANING A FENDER," which is incorporated herein by reference in its entirety.

TECHNICAL FIELD

The disclosure relates generally to dirt protection devices for vehicles. In particular aspects, the disclosure relates to a mudflap for a vehicle. The disclosure can be applied in heavy-duty vehicles, such as trucks, buses, and construction equipment. Although the disclosure may be described with respect to a particular vehicle, the disclosure is not restricted to any particular vehicle.

The disclosure also relates to a fender for a vehicle comprising such a mudflap. The disclosure also relates to a method of cleaning a mudflap as above mentioned and a method for cleaning a fender as above mentioned.

BACKGROUND

In the domain of dirt protection devices it is known to equip vehicles with mudflaps. These mudflaps intend to protect the frame of the vehicle and the environment of the vehicle, from dirt projections.

Known mudflaps are however not entirely satisfying. Indeed, dirt often accumulate over time on these known mudflaps, leading to a dead weight that not only induces an increase in fuel consumption for the vehicles, but also sometimes lead to damaging parts of the vehicle such as the mudflap itself.

To mitigate these issues, it is known to clean the mudflaps with pressurized water. Such solution is, however, not entirely satisfying. Indeed, this solution requires a pressurized water supply such that the cleaning can only take place in dedicated areas. Furthermore, such a cleaning is especially water intensive and thus not environmentally friendly.

The disclosure thus may aim at solving the above mentioned issues. In particular, the disclosure may aim at providing a mudflap which cleaning can be flexible and environment friendly, to efficiently remove accumulated dirt on said mudflap.

SUMMARY

According to a first aspect of the disclosure, a mudflap for a vehicle, configured to be installed on the vehicle, comprises:

a base layer, configured to be attached on the vehicle; and
an exposed layer, configured to be attached to the base layer and movable between an operation position, in which the exposed layer is attached to the base layer, and a cleaning position, in which the exposed layer is detached from the base layer,
the base layer comprising a plurality of protrusions and the exposed layer comprising a plurality of orifices, the protrusions of the base layer being engaged in the orifices of the exposed layer when the exposed layer is in its operation position. The first aspect of the disclosure may seek to obtain an easily cleanable mudflap, that can further be cleaned economically. A technical benefit may include removal of dirt trapped on and/or around the protrusions by moving the exposed layer from its operation position to its cleaning position.

In some examples the base layer comprises a first Velcro element and the exposed layer comprises a second Velcro element, the first Velcro element and second Velcro element cooperating to attach the base layer and the exposed layer when the exposed layer is in its operation position. A technical benefit may include a simple attachment/detachment of the exposed layer to easily move said exposed layer between its cleaning and operation position.

In some examples, a traversal section of a base of the protrusions is substantially similar to a transversal section of the orifices. A technical benefit may include removing most of the dust accumulated on/around the protrusions upon moving the exposed layer from its operation position to its cleaning position.

In some examples, the protrusions are spikes. A technical benefit may include minimizing the accumulation of dirt on the protrusions thus reducing the need for cleaning.

In some examples, the protrusions protrude from a side of the exposed layer opposed to the rest of the base layer when the exposed layer is in its operation position. A technical benefit may include collecting dirt around the protrusions, so that moving the exposed layer from its operation position to its cleaning position removes dirt collected around the protrusions.

In some examples, the protrusions protrude more than 5 mm from the side of the exposed layer opposed to the rest of the base layer. A technical benefit may include a better collection of dirt around the protrusion, leading to a more efficient cleaning through displacement of the exposed layer.

In some examples, the base layer comprises a main portion and at a least wall portion arranged at an edge of the main portion, the protrusion of the base layer protruding from the main portion along a protrusion direction and the wall portion protruding from the main portion along said protrusion direction. A technical benefit may include providing a better dirt protection from the mudflap and improving prehensility of the mud flap.

In some examples, the exposed layer covers at least 70% of the base layer when the exposed layer is in its operation position. A technical benefit may include a more efficient cleaning by simple displacement of the exposed layer.

In some examples, an average protrusion density of the base layer and an average orifice density of the exposed layer is comprised between 1 and 10 per square centimeter. A technical benefit may include a more efficient cleaning by simple displacement of the exposed layer.

In some examples, the base layer is configured to be attached to a mudguard, the base layer comprising at least a hole, the hole being configured to cooperate with a fastener of the mudguard of the vehicle so that the mudflap is attached on the mudguard. A technical benefit may include making the mudflap attachable/detachable relative to a mudguard.

In some examples, the base layer defines a guiding cavity extending in the base layer substantially perpendicular to the protrusions. A technical benefit may include cooperating with elements of the fender and/or of the mudguard to ease installation of removal of the mudflap on the mudguard.

According to a second aspect of the disclosure, a fender for a vehicle comprises a mudflap as above mentioned. The second aspect of the disclosure may seek to obtain an easily cleanable fender, that can further be cleaned economically.

In some examples, the mudflap is movable between an installed position where the base layer is attached on the mudguard and an uninstalled position where the base layer is detached from the mudguard. A technical benefit may include easing the cleaning of the mudflap.

In some examples, the mudguard comprises a guiding rod configured to cooperate with the guiding cavity of the mudflap for guiding in translation the mudflap between its installed and uninstalled positions. A technical benefit may include making easier the displacement of the mudflap between its installed and uninstalled positions.

In some examples, the mudguard comprises fasteners to lock the mudflap in its installed position, the fastener being quarter turns fasteners. A technical benefit may include an easy locking and unlocking of the mudflap to the mudguard to make the cleaning of the mudflap easier.

In some examples, the mudflap comprises a cooperation portion that lays on the mudguard, and a free portion, that overhangs from the mudguard. A technical benefit may include a better dirt protection efficiency of the fender.

According to a third aspect of the disclosure, a vehicle comprises a fender as above mentioned. The third aspect of the disclosure may seek to obtain a vehicle that is easy and economical to clean.

According to a fourth aspect of the disclosure, a method of cleaning a mudflap as exposed above comprises:

providing a dirty mudflap, dirt being located on a side of the exposed layer opposed to the base layer;

cleaning the dirty mudflap by moving the exposed layer from the operation position to the cleaning position. The fourth aspect of the disclosure may seek to easily and economically clean a mudflap.

According to a fifth aspect of the disclosure, a method of cleaning a fender as above mentioned, wherein the mudflap is movable between an installed position where the base layer is attached on the mudguard and an uninstalled position where the base layer is detached from the mudguard, comprises:

providing a fender comprising dirty mudflap, the mudflap being provided in its installed position and the exposed layer of the mudflap being provided in its operation position, dirt being located on a side of the exposed layer opposed to the base layer; and cleaning the dirty mudflap by moving the exposed layer from the operation position to the cleaning position. The fifth aspect of the disclosure may seek to easily and economically clean a fender.

In some examples, the method comprises, prior to cleaning the dirty mudflap, the displacement of the base layer from its installed position to its uninstalled position. A technical benefit may include easier cleaning of the fender.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

In this description, the terms "vertical", "up" and "down" are understood with reference to a vehicle in normal conditions of use. A first element being is in such context upper than a second element if the first element vertically further away from the ground than the second element. The terms "front" and "back" are also understood with reference to a vehicle in normal conditions of use a front element facing the direction towards which the vehicle is driving, by opposition to a back element.

In this description, the term "Velcro" relates to a hoop-and-loop fastener as known from the brand "Velcro".

Figure 1:
FIG. 1 is an exemplary fender comprising a mudflap of the disclosure.

Referring to FIG. 1, a vehicle 10 comprises a fender 12 and a wheel 14, the wheel 14 being hosted in the fender 12.

The vehicle 10 is for example a truck. In other examples, the vehicle is a bus or a construction equipment. It is understood that the disclosure could be applied to all kinds of vehicles.

The wheel 14 for example defines a wheel axis W. The wheel 14 is in particular configured to rotate about the wheel axis W for example around an axle (non illustrated).

As illustrated in FIG. 1, the fender 12 defines a wheel cavity 16. The wheel 14 of the vehicle is in particular arranged in the wheel cavity 16.

Figure 2:
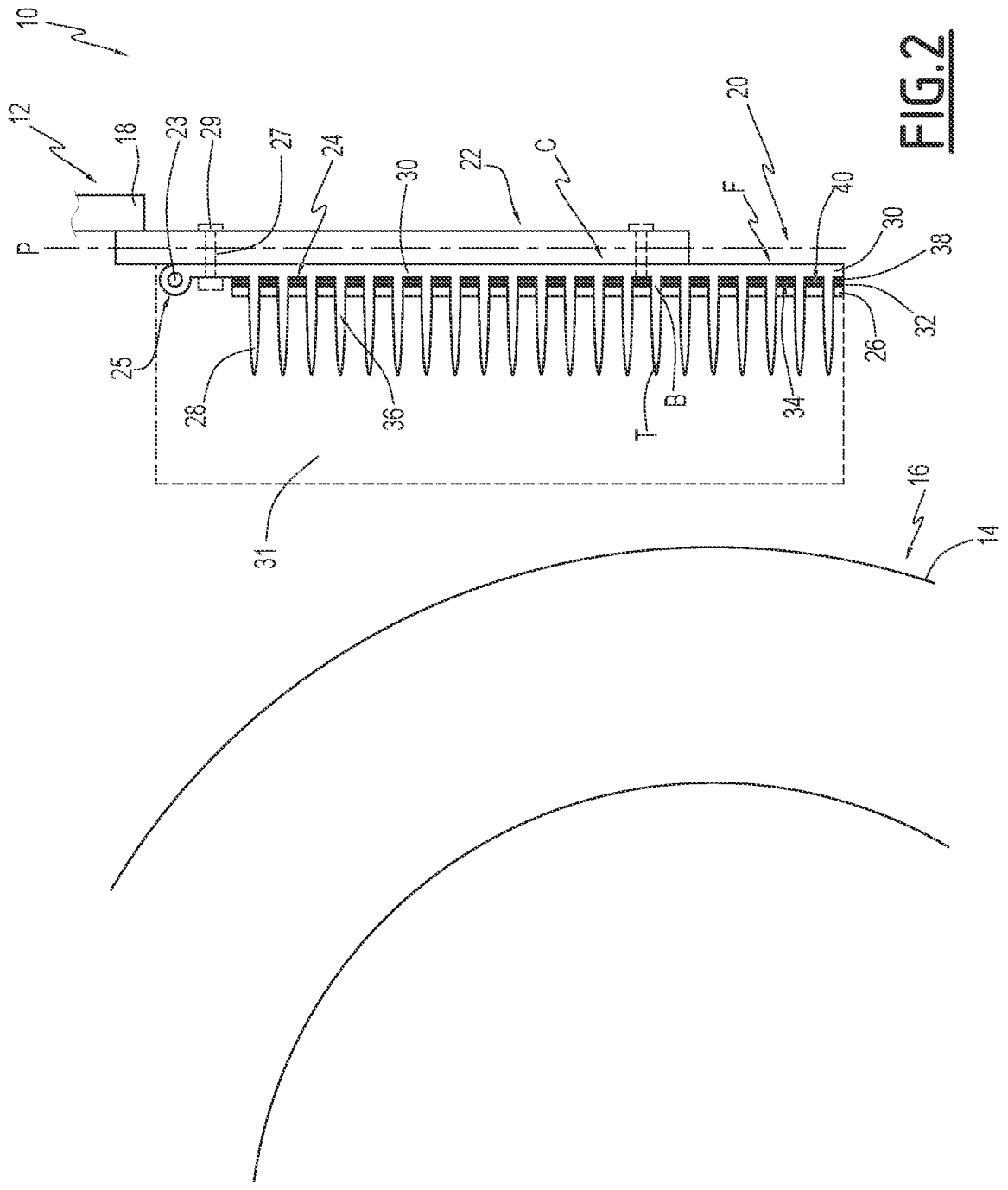
FIG. 2 is another illustration of a fender comprising a mudflap of the disclosure, wherein some elements of the mudflap are only partially illustrated.

Referring to FIGS. 1 and 2, the fender 12 comprises a frame 18 and a mudflap 20. In the example of FIGS. 1 and 2, the fender 12 further comprise a mudguard 22.

The frame 18 of the fender 12 is for example connected to a chassis (not illustrated) of a vehicle or is part of such chassis.

The mudguard 22 is for example configured to protect a back of the vehicle 10 from mud projections induced by the wheel 14.

The mudguard 22 is attached to the vehicle and is for example attached to the frame 18, for example by fastening means such as screws (not represented).

The mudflap 20 is configured to be installed on the vehicle 10. The mudflap 20 is for example in particular configured to be installed on the frame 18. In the example of FIGS. 1 and 2, the mudflap 20 is configured to be attached on the mudguard 22, the mudguard being attached to the frame 18. In some other non-illustrated examples, the fender 12 does not comprise a mudguard 22 and the mudflap 20 is directly attached to the frame 18. In such an example, the mudflap 20, or a portion of the mudflap acts for example as a mudguard.

The mudflap 20 is also for example configured to protect a back of the vehicle 10 from mud projections induced by the wheel 14.

The mudflap 20 extend substantially along a protection plane P. As illustrated in FIGS. 1 and 2, the protection plane P extends for example substantially parallel to the wheel axis W and for example substantially vertically.

In the example illustrated in FIG. 1, an upper portion of the mudguard 22 and of the mudflap 20 is curved around the wheel axis W to follow the curvature of the wheel 14, only the lower back portion of the mudguard 22 and of the mudflap 20 extending along the protection plane P.

As illustrated in FIG. 2, the mudflap 20 comprises a base layer 24 and an exposed layer 26.

As this will be exposed in more detail later, the exposed layer 26 is configured to be attached to the base layer 24. The exposed layer 26 is for example movable between an operation position and a cleaning position. In the operation position, the exposed layer 26 is for example attached to the base layer 24. In the cleaning position, the exposed layer 26 is for example detached from the base layer 24.

The base layer 24 is configured to be attached to the vehicle 10. In particular, as seen above, and as illustrated in the example of FIGS. 1 and 2, the base layer 24 is configured to be attached to the mudguard 22, which is itself attached on the frame 18 of the fender 12.

In particular, the mudflap 20 is movable between an installed position, where the base layer 24 is attached on the mudguard 22 and an uninstalled position, where the base layer 24 is detached from the mudguard 22. In some other non-illustrated examples, for example when the fender does not comprise a mudguard, the base layer 24 is attached on the frame 18 in an installed position and detached from the frame 18 in an uninstalled position.

The mudflap 20 comprises for example a cooperation portion C, that lays on the mudguard 22, and a free portion F, that overhangs from the mudguard 22. In the example of FIG. 2, the cooperation portion C lays on the mudguard 22 and the free portion F overhangs from the mudguard 22 when the mudflap 20 is in its installed position.

As illustrated from FIG. 2, the free portion F overhangs for example downwards from the mudguard 22. The free portion F overhangs for example from 50 mm to 700 mm from the mudguard 22.

As illustrated from FIG. 2, the mudguard 22 comprises for example a guiding rod 23 and the base layer defines for example a guiding cavity 25.

The guiding rod 23 is for example elongated along an elongation direction that is substantially parallel to the wheel axis W. As this will be understood later, the guiding cavity 25 for example extends in the base layer 24 substantially perpendicular to protrusions 28 of the base layer 24.

The guiding rod 23 is for example configured to cooperate with the guiding cavity 25 of the mudflap 20 for guiding in translation the mudflap 20 between its installed and uninstalled positions. The mudflap 20 is for example in its installed position when the guiding rod 23 is engaged in the guiding cavity 25.

The base layer 24 further comprises for example at least a hole 27, the hole being for example configured to cooperate with a fastener 29 so that the mudflap 20 is attached on the mudguard 22.

In particular, the fasteners 29 are configured to lock the mudflap 20 in its installed position. The fasteners 29 are for example configured to lock the mudflap 20 in its installed position once the guiding rod 23 is engaged in the guiding cavity 25.

In a specific example, the fasteners 29 are quarter turn fasteners, that is fasteners that can be fastened/unfastened by a rotation of 90°.

As illustrated in FIG. 2, the base layer 24 comprises a plurality of protrusions 28 and comprises for example a main portion 30, the plurality of protrusions 28 protruding for example from the main portion 30. For example, and as exposed in more detail later, the base layer 24 further comprises a first Velcro element 38. Furthermore, the base layer 24 comprises for example a wall portion 31.

In a specific example, and as illustrated in FIG. 2, the plurality of protrusions 28, the main portion 30 and for example the wall portion 31 are forming a single piece and are made of a same material.

The material of the protrusions 28 and/or of the main portion 30 are for example made of polyethylene.

As presented in FIG. 2, the protrusions 28 for example all protrude from a protrusion face 34 of the main portion 30 along a protrusion direction. As illustrated in FIG. 2, the protrusion direction is substantially perpendicular to the main portion 30 and is for example oriented towards the wheel 14 in the wheel cavity 16. The protrusion direction is thus for example orthogonal to the wheel axis W.

The protrusions 28 are for example spikes. A transversal section of the protrusions 28, taken perpendicularly to a protrusion direction, is for example inferior to 50 mm$^2$.

The transversal section of the protrusions 28 for example decreases from a base B of the protrusion to a tip T of the protrusion. The transversal section of all the protrusions 28 is for example identical.

The length of the protrusions, along the protrusion direction, is for example comprised between 10 mm and 100 mm. The length of all the protrusions 28 is for example identical.

An average protrusion density of the base layer is for example comprised between 0.5 and 10 protrusions per square centimeter, for example between 0.5 and 10 protrusions per square centimeter.

As illustrated in FIG. 2, the wall portion 31 is arranged at an edge (not referenced) of the main portion 30. The wall portion 31 protrudes for example from the main portion 30 along the protrusion direction. In other words, the wall portion 31 and the protrusions 28 protrude from the main portion 31 along a same direction. For clarity purposes, the main portion is only illustrated in dashed lane on FIG. 2.

As visible from FIG. 2, the first Velcro element 38 extends for example on the protrusion face 34. In particular, the first Velcro element 38 extends for example between the protrusions 28 on the protrusion face 34.

When the exposed layer 26 is in its operation position, the exposed layer extends on the base layer 24 and covers the base layer 24. The exposed layer 26 covers for example at least 70% of the base layer 24 when the exposed layer 26 is in its operation position.

As illustrated from FIG. 2, the exposed layer 26 comprises a plurality of orifices 36, or in other words the base layer 26 defines such orifices 36. As visible from FIG. 2, the exposed layer 26 for example further comprises a second Velcro element 32.

As visible in FIG. 2, where the exposed layer 26 is illustrated in its operation position, the protrusions 28 of the base layer 24 are engaged in the orifices 36 of the exposed layer 26 when the exposed layer 26 is in its operation position.

A transversal second of the base B of the protrusions is for example substantially similar to a transversal section of the orifices 36.

An average orifice density of the exposed layer is for example similar to the average protrusion density of the exposed layer 26.

As illustrated in FIG. 2, the protrusions 28 protrude for example from the exposed layer 26 through the orifices 36 when the exposed layer 26 is in its operation position. The protrusions 28 protrude for example from a side of the exposed layer 26 opposed to the rest of the base layer 24, that is the portion of the base layer 42 from which the protrusions 28 protrude.

The protrusions 28 protrude for example more than 5 mm, for example more than 10 mm, from the side of the exposed layer 26 opposed to the rest of the base layer 24.

The exposed layer 26 is for example configured to be displaced between its exposed position and cleaning position by engagement/disengagement of the protrusions 28 in the orifices 36.

The exposed layer 26 is for example made of a flexible element with a Shore A hardness comprised between 30 and 80. The exposed layer 26 is for example made of an elastomer.

As illustrated from FIG. 2, the second Velcro element 32 is for example arranged on a support face 40 of the exposed layer 26, the support face 40 being configured to face the base layer 24 when the exposed layer 26 is in its operation position. The second Velcro element 32 is for example arranged on the support face 40 around the orifices, as visible from FIG. 2.

The first Velcro element 38 and the second Velcro element 32 are for example configured to cooperate to be attached together.

As illustrated in FIG. 2, the first Velcro element 38 and the second Velcro 32 elements are for example cooperating to attach the base layer 24 and the exposed layer 26 when the exposed layer 26 is in its operation position.

One of the first 38 and second 32 Velcro element comprises for example hooks while the other of the first 38 and second 32 Velcro element comprises loops, for example from a velvet layer, the hooks being configured to cooperate with the loops so that the first 38 and second 32 Velcro elements are attached together. In a specific example, both first 38 and second 32 Velcro elements comprise hooks and loops.

A method of cleaning a mudflap 20 and a method for cleaning a fender 12 as previously described will now be presented.

The method for cleaning a mudflap 20 comprises providing a dirty mudflap 20. The exposed layer 26 of the mudflap 20 is provided in its operation position. By dirty mudflap, on understands that dirt such as mud covers the mudflap 20. In particular, dirt is located on a side of the exposed layer 26 that is opposed to the base layer 24 for the provided dirty mudflap 20.

As understood from the above description, and since dirt is located on a side of the exposed layer 26 that is opposed to the base layer 24, dirt is also located on and/or between the protrusions 28 that protrude from this face.

The method of cleaning a mudflap 20 then comprises cleaning the dirty mudflap 20 by moving the exposed layer 26 from the operation position to the cleaning position. In particular, movement of the exposed layer 26 from the operation position to the cleaning position detaches the dirt that is attached to the protrusions from said protrusions 28. The relative movement between the protrusions 28 and the exposed layer 26, and the strain in the dirt induced by such a relative displacement, allows for example to remove most of the dirt from the exposed layer 26.

Further to moving the exposed layer 26 from the operation position to the cleaning position, the method optionally comprises water cleaning of the exposed layer 26.

The method of cleaning a fender 12 comprises a cleaning of a mudflap 20 as previously exposed.

Furthermore, as seen above, the mudflap 20 is in some examples movable between an installed position where the base layer 24 is attached on the mudguard 22 and an uninstalled position where the base layer 24 is detached from the mudguard 22. The method of cleaning a fender 12 then for example comprises, prior to cleaning the dirty mudflap 20, the displacement of the mudflap 20 from its installed position to its uninstalled position.

In particular, the fasteners 29 are for example moved to unlock the mudflap 20 from its installed position and the mudflap 20 is guided, by the guiding rod 23, to its uninstalled position. The dirty mudflap 20 is for example only then cleaned by moving the exposed layer from its operation position to its cleaning position.

An alternative example of a fender 12 will now be presented. This example differs from the previously described fender only by the following elements.

In this example, the mudflap 20 is not movable between an installed position and an uninstalled position and is therefore constantly installed on the vehicle 10.

In particular, the base layer 24 is for example fixed on the frame 18 of the fender. The base layer 24 is for example part of a mudguard 22 which is fixed to the frame 18.

One can thus clean such a fender 12 only by displacing the exposed layer from its operation position to its cleaning position.

What is claimed is:

1. A mudflap for a vehicle, configured to be installed on the vehicle, comprising:
    a base layer, configured to be attached to the vehicle; and
    an exposed layer, configured to be attached to the base layer and movable between an operation position, in which the exposed layer is attached to the base layer, and a cleaning position, in which the exposed layer is detached from the base layer;
    wherein the base layer comprises a plurality of protrusions and the exposed layer comprises a plurality of orifices, the protrusions of the base layer being engaged in the orifices of the exposed layer when the exposed layer is in its operation position.

2. The mudflap of claim 1, wherein the base layer comprises a first element and the exposed layer comprises a second element, the first element and second element cooperating to attach the base layer and the exposed layer when the exposed layer is in its operation position.

3. The mudflap of claim 1, wherein a transversal section of a base of the protrusions is substantially similar to a transversal section of the orifices.

4. The mudflap of claim 1, wherein the protrusions are spikes.

5. The mudflap of claim 1, wherein the protrusions protrude from a side of the exposed layer opposed to the rest of the base layer when the exposed layer is in its operation position.

6. The mudflap of claim 5, wherein the protrusions protrude more than 5 mm from the side of the exposed layer opposed to the rest of the base layer.

7. The mudflap of claim 1, wherein the base layer comprises a main portion and at least a wall portion arranged at an edge of the main portion, the protrusion of the base layer protruding from the main portion along a protrusion direction and the wall portion protruding from the main portion along said protrusion direction.

8. The mudflap of claim 1, wherein the exposed layer covers at least 70% of the base layer when the exposed layer is in its operation position.

9. The mudflap of claim 1, wherein the base layer is configured to be attached to a mudguard, the base layer comprising at least a hole, the hole being configured to cooperate with a fastener of the mudguard of the vehicle so that the mudflap is attached on the mudguard.

10. The mudflap of claim 1, wherein the base layer defines a guiding cavity extending in the base layer substantially perpendicular to the protrusions.

11. A fender for a vehicle comprising the mudflap of claim 1.

12. The fender of claim 11, wherein the fender comprises a mudguard, the mudflap being movable between an installed position where the base layer is attached on the mudguard and an uninstalled position where the base layer is detached from the mudguard.

13. The fender of claim 12, wherein the base layer of the mudflap defines a guiding cavity extending in the base layer substantially perpendicular to the protrusions, the mudguard comprising a guiding rod configured to cooperate with the guiding cavity of the mudflap for guiding in translation of the mudflap between the installed and uninstalled positions.

14. The fender of claim 12, wherein the mudguard comprises fasteners to lock the mudflap in the installed position, the fasteners being quarter turn fasteners.

15. The fender of claim 11, wherein the mudflap comprises a cooperation portion that lays on the mudguard, and a free portion that overhangs from the mudguard.

16. A vehicle comprising the fender of claim 11.

17. A method of cleaning the mudflap of claim 1, wherein the method comprises:

provising a dirty mudflap, the exposed layer of the mudflap being provided in its operation position, dirt being located on a side of the exposed layer opposed to the rest of the base layer; and cleaning the dirty mudflap by moving the exposed layer from the operation position to the cleaning position.

18. A method of cleaning the fender of claim 11, wherein the method comprises:

providing a fender comprising a dirty mudflap, the exposed layer of the mudflap being provided in its operation position, dirt being located on a side of the exposed layer opposed to the base layer; and cleaning the dirty mudflap by moving the exposed layer from the operation position to the cleaning position.

19. The method of claim 18, wherein the mudflap is movable between an installed position where the base layer is attached on the mudguard and an uninstalled position where the base layer is detached from the mudguard, wherein the method comprises, prior to cleaning the dirty mudflap, the displacement of the mudflap from the installed position to the uninstalled position.

* * * * *